(12) United States Patent
Joo et al.

(10) Patent No.: US 8,810,755 B2
(45) Date of Patent: Aug. 19, 2014

(54) DISPLAY PANEL AND LIQUID CRYSTAL DISPLAY COMPRISING THE SAME

(75) Inventors: Sun-Kyu Joo, Seoul (KR); Ju-Hyeon Baek, Cheonan-si (KR); Beom-Jun Kim, Seoul (KR); Yu-Jun Kim, Incheon-si (KR); Young-Joon Cho, Asan-si (KR)

(73) Assignee: Samsung Display Co., Ltd., Yongin (KR)

( * ) Notice: Subject to any disclaimer, the term of this patent is extended or adjusted under 35 U.S.C. 154(b) by 159 days.

(21) Appl. No.: 12/762,006

(22) Filed: Apr. 16, 2010

(65) Prior Publication Data

US 2011/0069258 A1 Mar. 24, 2011

(30) Foreign Application Priority Data

Sep. 21, 2009 (KR) .................. 10-2009-0089264

(51) Int. Cl.
*G02F 1/1335* (2006.01)
*G02B 5/20* (2006.01)
*G02F 1/1339* (2006.01)

(52) U.S. Cl.
CPC .......... *G02B 5/201* (2013.01); *G02F 1/133514* (2013.01); *G02F 1/13394* (2013.01); *G02F 2001/13396* (2013.01)
USPC ........................................ 349/106

(58) Field of Classification Search
USPC ........................................ 349/157
See application file for complete search history.

(56) References Cited

U.S. PATENT DOCUMENTS

| | | | |
|---|---|---|---|
| 6,459,468 B2 | 10/2002 | Shibahara | |
| 2003/0090609 A1 | 5/2003 | Inoue et al. | |
| 2003/0160916 A1* | 8/2003 | Nakagawa et al. | 349/106 |
| 2005/0099581 A1* | 5/2005 | Inoue et al. | 349/157 |
| 2007/0070047 A1* | 3/2007 | Jeon et al. | 345/173 |

FOREIGN PATENT DOCUMENTS

| | | |
|---|---|---|
| CN | 1862331 | 11/2006 |
| KR | 100398424 | 9/2003 |
| KR | 1020040062210 | 7/2004 |
| KR | 1020070036416 | 4/2007 |
| KR | 1020070069409 | 7/2007 |
| KR | 100756305 | 8/2007 |
| KR | 1020080005758 | 1/2008 |
| KR | 1020080045381 | 5/2008 |
| KR | 1020080052836 | 6/2008 |
| KR | 1020080099142 | 11/2008 |

* cited by examiner

*Primary Examiner* — Wen-Ying P Chen
(74) *Attorney, Agent, or Firm* — H.C. Park & Associates, PLC

(57) ABSTRACT

A display panel and a liquid crystal display device, in which one of a plurality of color filters is a net-shaped color filter and the other color filters are island-shaped color filters, are provided. According to this approach, a thickness uniformity of the display panel may be achieved.

20 Claims, 7 Drawing Sheets

DISPLAY PANEL AND LIQUID CRYSTAL DISPLAY COMPRISING THE SAME

CROSS-REFERENCE TO RELATED APPLICATION

This application claims priority from and the benefit of Korean Patent Application No. 10-2009-0089264 filed on Sep. 21, 2009, which is hereby incorporated by reference for all purposes as if fully set forth herein.

BACKGROUND OF THE INVENTION

1. Field of the Invention

Exemplary embodiments of the present invention relate to a display panel and method for manufacturing a liquid crystal display device.

2. Description of the Background

A liquid crystal display has been adopted as one of flat panel displays that are now widely used. Typically, in a liquid crystal display device, a voltage is applied to generate an electric field in a liquid crystal layer, which determines the direction of liquid crystal molecules of the liquid crystal layer, and an image is displayed by controlling the polarization of incident light.

A conventional display panel of the liquid crystal display may include a color filter. The color filter may display various colors, and may be disposed according to desired color to display. As a thickness of the color filter may be different for each color, spacers disposed on the color filter result in different thickness of a display panel. As a consequence, it may not easy to obtain a thickness uniformity of the display panel.

Therefore, there is a need for an approach to improve a thickness uniformity of a display panel.

SUMMARY OF THE INVENTION

These and other needs are addressed by the present invention, in which exemplary embodiments provide a display panel capable of maintaining a thickness uniformity of the display panel device.

Additional features of the invention will be set forth in the description which follows, and in part will be apparent from the description, or may be learned by practice of the invention.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

Exemplary embodiments of the present invention disclose a display panel device. The display panel device includes a substrate. The display panel device includes a first color filter and a second color filter disposed on the substrate. The display panel device also includes a plurality of spacers disposed on the first color filter and the second color filter. The first color filter is a net-shaped color filter comprising a plurality of openings, and the second color filter is an island-shaped color filter disposed in the plurality of openings, and the plurality of spacers overlap the net-shaped color filter.

Exemplary embodiments of the present invention disclose a liquid crystal display. The liquid crystal display includes a first display panel and a second display panel facing each other. The liquid crystal display also includes a liquid crystal layer disposed between the first display panel and the second display panel. The second display panel comprises a second substrate, a first color filter and a second color filter disposed on the second substrate, and a plurality of spacers disposed on the first color filter and the second color filter. And the first color filter is a net-shaped color filter comprising a plurality of openings and the second color filter is an island-shaped color filter disposed in the plurality of openings, and the plurality of spacers overlap the net-shaped color filter.

Exemplary embodiments of the present invention disclose a method for manufacturing a display panel. The method includes forming a first color filter comprising a plurality of openings and a second color filter disposed in the plurality of openings formed on a substrate. The method also includes forming a spacer overlapping the first color filter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

A display panel device and method of manufacturing a display panel device are disclosed. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

It is understood that when an element such as a layer, a film, a region, or a substrate is referred to as being "on" an element, it can be directly on the element, over the element or intervening elements may also be present. If any part is referred to be disposed directly on a part, it means that there is no intermediate part between the two parts. In contrast, when an element such as a layer, film, region, or substrate is referred to as being "under" an element, it can be directly under the element, below the element, or intervening elements may also be present. If any part is said to be disposed directly under a part, it means that there is no intermediate part between the two parts.

Now, a display panel according to exemplary embodiments of the present invention will be described with reference to FIG. 1 and FIG. 2.

Figure 1:
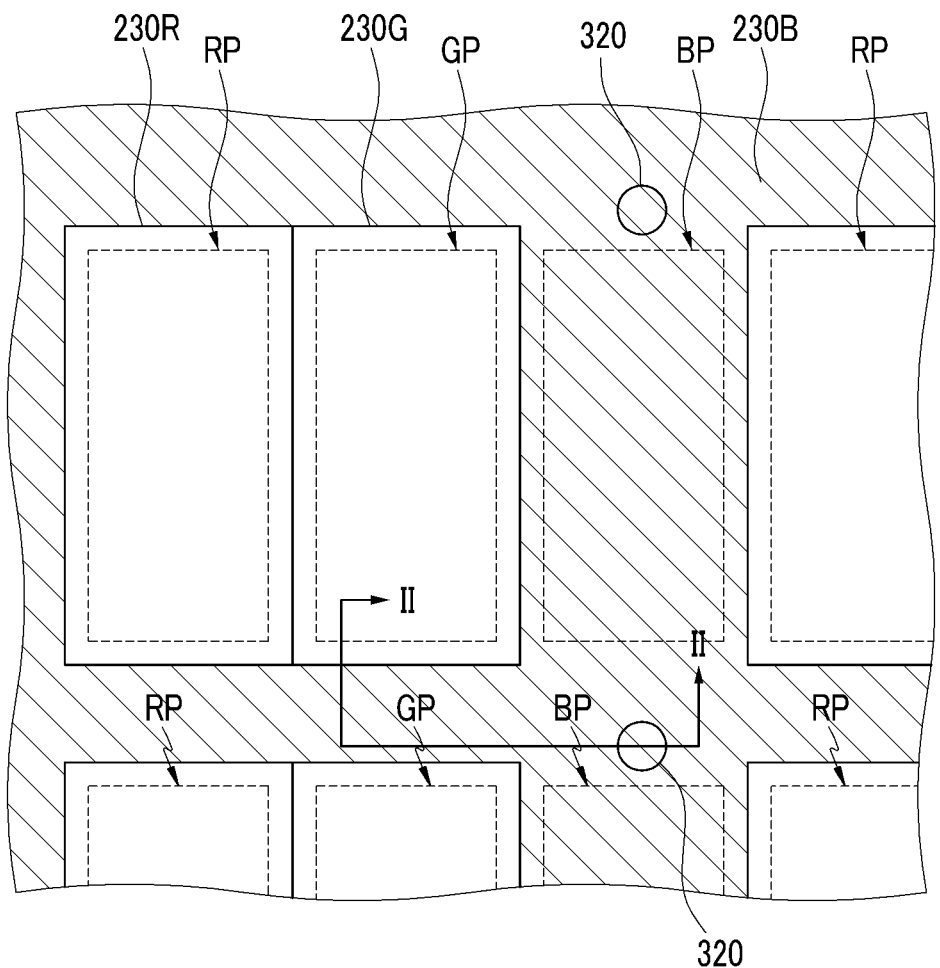
FIG. 1 is a top plan view of a display panel, according to exemplary embodiments of the present invention.
Figure 2:
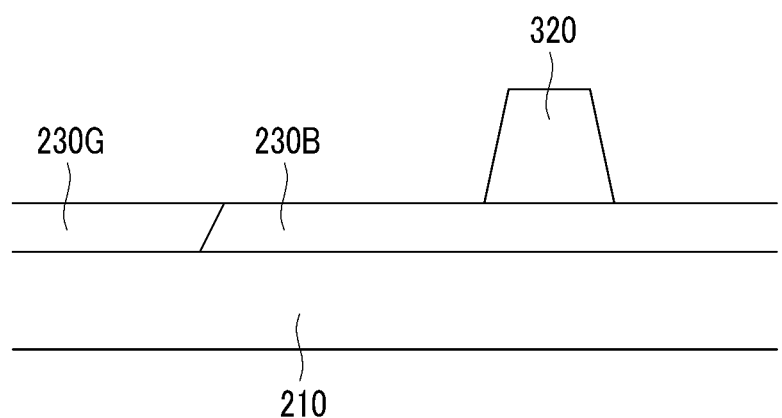
FIG. 2 is a cross-sectional view of the display panel of FIG. 1 taken along the line II-II.

FIG. 1 is a top plan view of a display panel according to exemplary embodiments of the present invention, and FIG. 2 is a cross-sectional view of the display panel of FIG. 1 taken along the line II-II.

Referring to FIG. 1 and FIG. 2, a display panel device may be divided into a plurality of pixel areas RP, GP, and BP, and the pixel areas RP, GP, and BP may be arranged as a matrix. Each of pixel areas RP, GP, and BP may display one of primary colors, and a desired color may be recognized by the spatial or temporal sum of the primary colors. For example, the primary colors may be three primary colors such as a red, a green, and a blue color, and the red pixel area RP, the green pixel area GP, and the blue pixel area BP can sequentially be arranged in a row direction based on the display panel device.

Each pixel area RP, GP, BP may correspond to each color filters 230R, 230G, and 230B, and may display the color representing from the corresponding color filters 230R, 230G, and 230B. The color filters 230R, 230G, and 230B may respectively cover the corresponding pixel areas RP, GP, and BP. In FIG. 1, the pixel areas RP, GP, and BP are referred to as regions represented by a dotted line.

The color filters 230R, 230G, and 230B can be disposed on a substrate 210. The substrate 210 may be transparent and may be an insulating material. For example, the material of the substrate 210 may include glass or plastic.

The color filters 230R, 230G, and 230B may respectively represent one of primary colors, and the primary colors include, for example, a red, a green, and a blue. The color filters 230R, 230G, and 230B may include a pigment and a photosensitive material. In some examples, one of the color filters 230R, 230G, and 230B has a net shape and the other two have an island shape. For example, one of the net-shaped color filters among the color filters 230R, 230G, and 230B has a plurality of openings arranged in a matrix, and two of the island-shaped color filters among the color filters 230R, 230G, and 230B can be disposed in the plurality of openings. For example, as shown in FIG. 1, the blue color filter 230B may have the net-shaped color filter, and the red color filter 230R and the green color filter 230G may have the island-shaped color filter. In FIG. 1, the blue color filter 230B is represented by the slashed portion. Here, one red color filter 230R and one green color filter 230G may be disposed in the same opening of the blue color filter 230B. Also, when the red color filter 230R has the net shape, the green color filter 230G and the blue color filter 230B may have the island shape, and when the green color filter 230G has the net shape, the red color filter 230R and the blue color filter 230B may have the island shape. As shown in FIG. 1, the color filters 230R, 230G, and 230B may meet one another near the boundaries between the color filters 230R, 230G, and 230B. Also, the color filters 230R, 230G, and 230B may be overlapped with one another or may be separated from one another.

The spacer 320, as a column spacer, may be disposed on the color filters 230R, 230G, and 230B. At least one of the plurality of spacers 320 may overlap one of the color filters 230R, 230G, and 230B having the net shape among the color filters 230R, 230G, and 230B. For example, at least one of the plurality of spacers 320 may be disposed between the pixel areas where the color representing from one of the color filters 230R, 230G, and 230B having the net shape is provided. As shown in FIG. 1, the spacer 320 may overlap the net-shaped color filter 230B. For example, the spacer 320 may be disposed between the blue pixel area BP and another blue pixel area BP that is disposed on or under thereof.

Also, the spacer 320 may simultaneously be disposed between a plurality of blue pixel areas BP, between a plurality of green pixel areas GP, and between a plurality of red pixel areas RP. In this example, a portion between the plurality of green pixel areas GP means a portion between the plurality of green color filters 230G, and a portion between the plurality of red pixel areas RP means a portion between the plurality of red color filters 230R. In some examples, at least one spacer may be disposed between the island-shaped color filters arranged in the column direction. Also, the spacer 320 may be disposed between the blue pixel areas BP and simultaneously be disposed between the red pixel areas RP. When the plurality of spacers 320 are disposed between two or more pixel areas RP, GP, and BP, portions of the plurality of spacers 320 can be a main spacers having a thick thickness, and the remaining portions may be sub-spacers having a thin thickness. The spacers 320 may have a shape that can be extended in the column direction. For example, one spacer 320 may simultaneously be disposed between the green pixel areas GP and between the blue pixel areas BP. The plane shape of the spacers 320 may be a circular, an oval, or a quadrangular. Also, an arrangement, a number, a kind, and a shape of the spacers 320 may be variously changed, by way of configuration of manufacturing process. In some examples, two or more of the plurality of spacers 320 may overlap one of the net-shaped color filters 230R, 230G, and 230B among the color filters 230R, 230G, and 230B. In this regard, a thickness uniformity of the display panel device may be achieved.

Next, a display panel according to exemplary embodiments of the present invention will be described with reference to FIG. 3 and FIG. 4. The same constituent elements as of the previous exemplary embodiment with respect to FIG. 1 and FIG. 2 are indicated by the same reference numerals, and the same description may be omitted to avoid unnecessarily obscuring the present invention.

Figure 3:
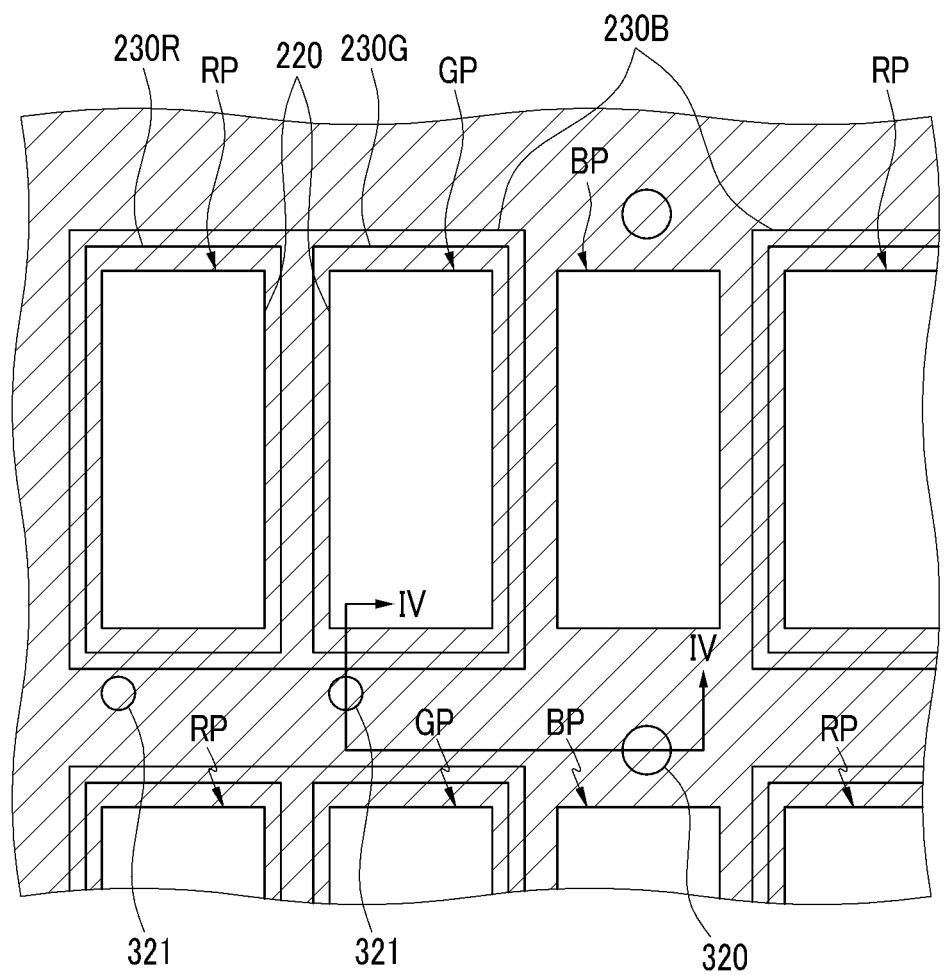
FIG. 3 is a top plan view of a display panel, according to exemplary embodiments of the present invention.
Figure 4:
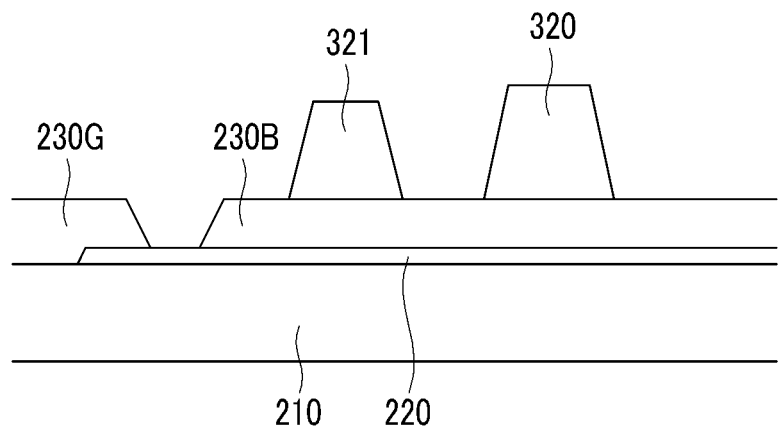
FIG. 4 is a cross-sectional view of the display panel of FIG. 3 taken along the line IV-IV.

FIG. 3 is a top plan view of a display panel according to exemplary embodiments of the present invention, and FIG. 4 is a cross-sectional view of the display panel of FIG. 3 taken along the line IV-IV.

For the illustration purpose, referring to FIG. 3 and FIG. 4, the description for the display panel of FIG. 1 and FIG. 2 may similarly be applied except for a light blocking member 220 between the substrate 210 and the color filters 230R, 230G, and 230B.

A display panel can be divided in a plurality of pixel areas RP, GP, and BP, and the pixel areas RP, GP, and BP are arranged as a matrix. The pixel areas RP, GP, and BP may respectively correspond to the color filters 230R, 230G, and 230B, thereby representing the colors of the corresponding color filters 230R, 230G, and 230B. The color filters 230R, 230G, and 230B may respectively cover the pixel areas RP, GP, and BP. In FIG. 3, the pixel areas RP, GP, and BP can respectively be a region represented by solid lines.

One of the color filters 230R, 230G, and 230B has the net shape, and the other two filters have the island shape. For example, one of the net-shaped color filters among the color filters 230R, 230G, and 230B may have a plurality of openings arranged in a matrix, and two of the island-shaped color filters among the color filters 230R, 230G, and 230B may be disposed in the plurality of openings. For example, as shown in FIG. 3, the blue color filter 230B has the net shape, and the red color filter 230R and the green color filter 230G may have the island shape. In this example, one red color filter 230R and one green color filter 230G can be disposed in the same opening of the blue color filter 230B. Also, when the red color filter 230R has the net shape, the green color filter 230G and the blue color filter 230B may have the island shape, and when the green color filter 230G has the net shape, the red color filter 230R and the blue color filter 230B may have the island shape. As shown in FIG. 3, the color filters 230R, 230G, and 230B can be separated from one another near the boundary between the color filters 230R, 230G, and 230B. Also, the color filters 230R, 230G, and 230B may be overlapped with one another or may meet each other.

A light blocking member 220 referred to as a black matrix may prevent light leakage from between the plurality of color filters 230R, 230G, and 230B. The light blocking member 220 with a net shape has a plurality of openings to pass the light therethrough. In FIG. 3, the slashed portion is the light blocking member 220. The island-shaped color filters 230R and 230G may respectively cover the openings of the light blocking member 220. The color filter 230B of the net shape may cover the opening of the light blocking member 220 that may not be covered by the island-shaped color filters 230R and 230G. The light blocking member 220 may be disposed between the plurality of the island-shaped color filters 230R that can be arranged in the column direction. Also, the light blocking member 220 may be disposed between the island-shaped color filters 230R and 230G and the net-shaped color filter.

The main spacer 320 and the sub-spacer 321, having thinner thickness than that of the main spacer 320, may overlap the blue color filter 230B. Accordingly, the main spacer 320 and the sub-spacer 321 disposed on the blue color filter 230B may have substantially the same thickness such that the thickness uniformity of the display panel may be obtained. This scheme may particularly be observed when compared with an approach that the spacers are disposed on the color filters which represent different colors.

In some examples, it is contemplated that at least one of the plurality of main spacers 320 and the plurality of sub-spacers 321 may overlap with at least one of the net-shaped color filters 230R, 230G, and 230B among the color filters 230R, 230G, and 230B. For example, at least one of the plurality of main spacers 320 may be disposed between the pixel areas that represent the color of one of the net-shaped color filters 230R, 230G, and 230B. For example, the main spacer 320 may be disposed between the blue pixel area BP and another blue pixel area BP that may be disposed on or under thereof. One or more main spacers 320 may be formed in the display panel. The sub-spacers 321 may be respectively disposed between the plurality of green pixel areas GP and between the plurality of red pixel areas RP. In this example, at least one of the sub-spacers may be disposed between the color filters of the island shape arranged in the column direction. By way of configuration, one or more sub-spacers 321 may be formed in the display panel, or they may be omitted. At least one of the plurality of main spacers 320 and the plurality of sub-spacers 321 may have a shape that can be extended in the column direction. For example, one main spacer 320 may simultaneously be disposed between the green pixel areas GP and between the blue pixel areas BP. Also, one sub-spacer 321 may simultaneously be disposed between the green pixel areas GP and between the red pixel areas RP. Also, an arrangement, a number, and a shape of the main spacers 320 and the sub-spacers 321 may be variously changed by way of configuration of manufacturing process. In some examples, two or more of the plurality of main spacers 320 and the plurality of sub-spacers 321 may overlap one of the net-shaped color filters 230R, 230G, and 230B among the color filters 230R, 230G, and 230B, and thereby the thickness uniformity of the display panel device may be achieved.

Next, a display panel according to exemplary embodiments of the present invention will be described with reference to FIG. 5. The same constituent elements as of the previous exemplary embodiment with respect to FIG. 1, FIG. 2, FIG. 3 and FIG. 4 are indicated by the same reference numerals, and the same description may be omitted to avoid unnecessarily obscuring the present invention.

Figure 5:
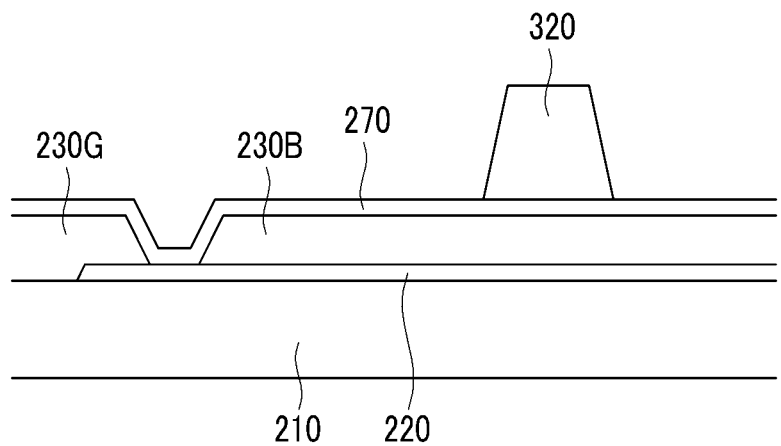
FIG. 5 is a cross-sectional view of a display panel, according to exemplary embodiments of the present invention.

FIG. 5 is a cross-sectional view of a display panel, according to exemplary embodiments of the present invention.

For the illustration purpose, referring to FIG. 5, the description of the display panel of FIG. 3 and FIG. 4, except for a common electrode 270 disposed on the color filters 230R, 230G, and 230B, and the spacers 320, and the omission of the sub-spacers 321, may similarly be applied. The common electrode 270 may include a transparent conductive material such as ITO and IZO. Also, an overcoat may be further included between the color filters 230R, 230G, and 230B, and the common electrode 270.

One of the color filters 230R, 230G, and 230B may have a net shape, and the other two may have an island shapes. In this example, one of the net-shaped color filters among the color filters 230R, 230G, and 230B may have a plurality of openings arranged in a matrix, and two of the island-shaped color filters among the color filters 230R, 230G, and 230B can be disposed in the plurality of openings. For example, the blue color filter 230B may have the net shape, and the red color filter 230R and the green color filter 230G may have the island shape. Here, one of the red color filter 230R and one of the green color filter 230G can be disposed in the same opening of the blue color filter 230B. Also, when the red color filter 230R has the net shape, the green color filter 230G and the blue color filter 230B may have the island shape, and when the green color filter 230G has the net shape, the red color filter 230R and the blue color filter 230B may have the island shape. The color filters 230R, 230G, and 230B may face one another, and may overlap one another, or may be separated from one another near the boundaries between the color filters 230R, 230G, and 230B.

The net-shaped light blocking member 220 may have a plurality of openings to pass the light therethrough. The island-shaped color filters 230R and 230G may respectively cover the openings of the light blocking member 220. The color filter 230B of the net shape may cover the opening of the light blocking member 220 that may not be covered by the island-shaped color filters 230R and 230G. The light blocking member 220 may be disposed between the plurality of island-shaped color filters 230R that may be arranged in the column direction. Also, the light blocking member 220 may be disposed between the island-shaped color filters 230R and 230G and the net-shaped color filter 230B.

The main spacer 320 and the sub-spacer 321, having the thinner thickness than that of the main spacer 320, may overlap the blue color filter 230B. Accordingly, the main spacer 320 and the sub-spacer 321 disposed on the blue color filter 230B may have substantially the same thickness such that the thickness uniformity of the display panel may be further obtained. This may particularly be observed when compared with an approach that the spacers are disposed on the color filters of the different colors.

In some examples, it is contemplated that at least one of the plurality of main spacers 320 and the plurality of sub-spacers 321 may overlap with at least one of the net-shaped color filters 230R, 230G, and 230B among the color filters 230R, 230G, and 230B. For example, at least one of the plurality of main spacers 320 may be disposed between the pixel areas that represent the color of one of the net-shaped color filters 230R, 230G, and 230B. For example, the main spacer 320 may be disposed between the blue pixel area BP and another blue pixel area BP that may be disposed on or under thereof. One or more main spacers 320 may be formed in the display panel. The sub-spacers 321 may be respectively disposed between the plurality of green pixel areas GP and between the plurality of red pixel areas RP. In this example, at least one sub-spacer may be disposed between the island-shaped color filters arranged in the column direction. By way of configuration, one or more sub-spacers 321 may be formed in the display panel, or they may be omitted. At least one of the plurality of main spacers 320 and the plurality of sub-spacers 321 may have a shape that can be extended in the column direction. For example, one main spacer 320 may be simultaneously be disposed between the green pixel areas GP and between the blue pixel areas BP. Also, one sub-spacer 321 may simultaneously be disposed between the green pixel areas GP and between the red pixel areas RP. Also, an arrangement, a number, and a shape of the main spacers 320 and the sub-spacers 321 may be variously changed by way of configuration for achieving an optimum manufacturing process. In some examples, two or more of the plurality of main spacers 320 and the plurality of sub-spacers 321 may overlap one of the net-shaped color filters 230R, 230G, and 230B among the color filters 230R, 230G, and 230B, and thereby the thickness uniformity of the display panel device may be achieved.

Next, a display panel according to exemplary embodiments of the present invention will be described with reference to FIG. 6. The same constituent elements as of the previous exemplary embodiment with respect to FIG. 1, FIG. 2, FIG. 3, FIG. 4 and FIG. 5 are indicated by the same reference numerals, and the same description may be omitted to avoid unnecessarily obscuring the present invention.

Figure 6:
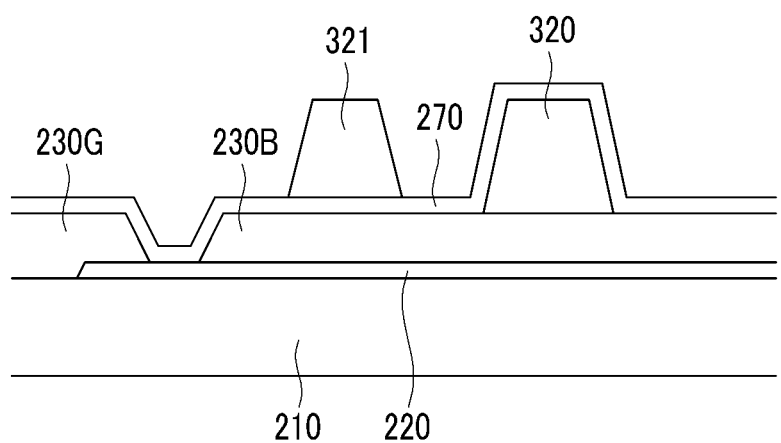
FIG. 6 is a cross-sectional view of a display panel, according to exemplary embodiments of the present invention.

FIG. 6 is a cross-sectional view of a display panel, according to exemplary embodiments of the present invention.

For the illustration purpose, referring to FIG. 6, the description of the display panel of FIG. 5, except for the common electrode 270 disposed on the spacer 320, and the spacer 321 disposed on the common electrode 270, may similarly be applied. The spacer 321 may include both the main spacers and the sub-spacers, or may include only the main spacers. In this example, the sub-spacers 320 may have thinner thicknesses than those of the main spacers. The common electrode 270 may cover the whole surface of the display panel, and a portion overlapping the spacer 320 among the common electrode 270 may serve as the touch screen panel. The detailed description of the application thereof will be given with reference to FIG. 8 to FIG. 10. Also, an overcoat may further be included between the color filters 230R, 230G, and 230B and the common electrode 270.

One of the color filters 230R, 230G, and 230B has the net shape, and the other two have the island shape. In this example, one of the net shaped color filters among the color filters 230R, 230G, and 230B has a plurality of openings arranged in a matrix, and two of the island shaped color filters among the color filters 230R, 230G, and 230B may be disposed in the plurality of openings. For example, the blue color filter 230B has the net shape, and the red color filter 230R and the green color filter 230G may have the island shape. For example, one of the red color filters 230R and one of the green color filters 230G may be disposed in the same opening of the blue color filter 230B. Also, when the red color filter 230R has the net shape, the green color filter 230G and the blue color filter 230B may have the island shape, and when the green color filter 230G has the net shape, the red color filter 230R and the blue color filter 230B may have the island shape. The color filters 230R, 230G, and 230B may meet one another, may overlap one another, or may be separated from one another near the boundaries between the color filters 230R, 230G, and 230B.

The net-shaped light blocking member 220 may have a plurality of openings passing the light therethrough. The color filters 230R and 230G of the island shape may respectively cover the openings of the light blocking member 220. The color filter 230B of the net shape may cover the opening of the light blocking member 220 that may not be covered by the color filters 230R and 230G of the island shape. The light blocking member 220 may be disposed between the plurality of color filters 230R of the island shape that may be arranged in the column direction. Also, the light blocking member 220 may be disposed between the island-shaped color filters 230R and 230G and the net-shaped color filter 230B.

The main spacers 320 and the sub-spacers 321, having the thinner thicknesses than those of the main spacers 320, may overlap the blue color filter 230B. Accordingly, the main spacers 320 and the sub-spacers 321 may be disposed on the blue color filter 230B having substantially same thickness such that the thickness uniformity of the display panel may be obtained. This scheme may particularly be observed when compared with an approach that the spacers are disposed on the color filters which represent different colors.

In some examples, it is contemplated that at least one of the plurality of main spacers 320 and the plurality of sub-spacers 321 may overlap with at least one of the net-shaped color filters 230R, 230G, and 230B among the color filters 230R, 230G, and 230B. For example, at least one of the plurality of main spacers 320 may be disposed between the pixel areas that represent the color of one of the net-shaped color filters 230R, 230G. For example, the main spacer 320 may be disposed between the blue pixel area BP and the other blue pixel area BP that may be disposed on or under thereof. One or more main spacers 320 may be formed in the display panel. The sub-spacers 321 may be respectively disposed between the plurality of green pixel areas GP and between the plurality of red pixel areas RP. In this example, at least one sub-spacer may be disposed between the color filters of the island shape arranged in the column direction. By way of configuration, one or more sub-spacers 321 may be formed in the display panel, or they may be omitted. At least one of the plurality of main spacers 320 and the plurality of sub-spacers 321 may have a shape that can be extended in the column direction. For example, one main spacer 320 may simultaneously be disposed between the green pixel areas GP and between the blue pixel areas BP. Also, one sub-spacer 321 may simultaneously be disposed between the green pixel areas GP and between the red pixel areas RP. Also, an arrangement, a number, and a shape of the main spacers 320 and the sub-spacers 321 may be variously changed by way of configuration for achieving an optimum manufacturing process. In some examples, two or more of the plurality of main spacers 320 and the plurality of sub-spacers 321 may overlap one of the net-shaped color filters 230R, 230G, and 230B having the net shape among the color filters 230R, 230G, and 230B, and thereby the thickness uniformity of the display panel device may be obtained.

A display panel according to exemplary embodiments of the present invention will be described with reference to FIG. 7. The same constituent elements as of the previous exemplary embodiment with respect to FIG. 1, FIG. 2, FIG. 3, FIG. 4, FIG. 5 and FIG. 6 are indicated by the same reference numerals, and the same description may be omitted to avoid unnecessarily obscuring the present invention.

Figure 7:
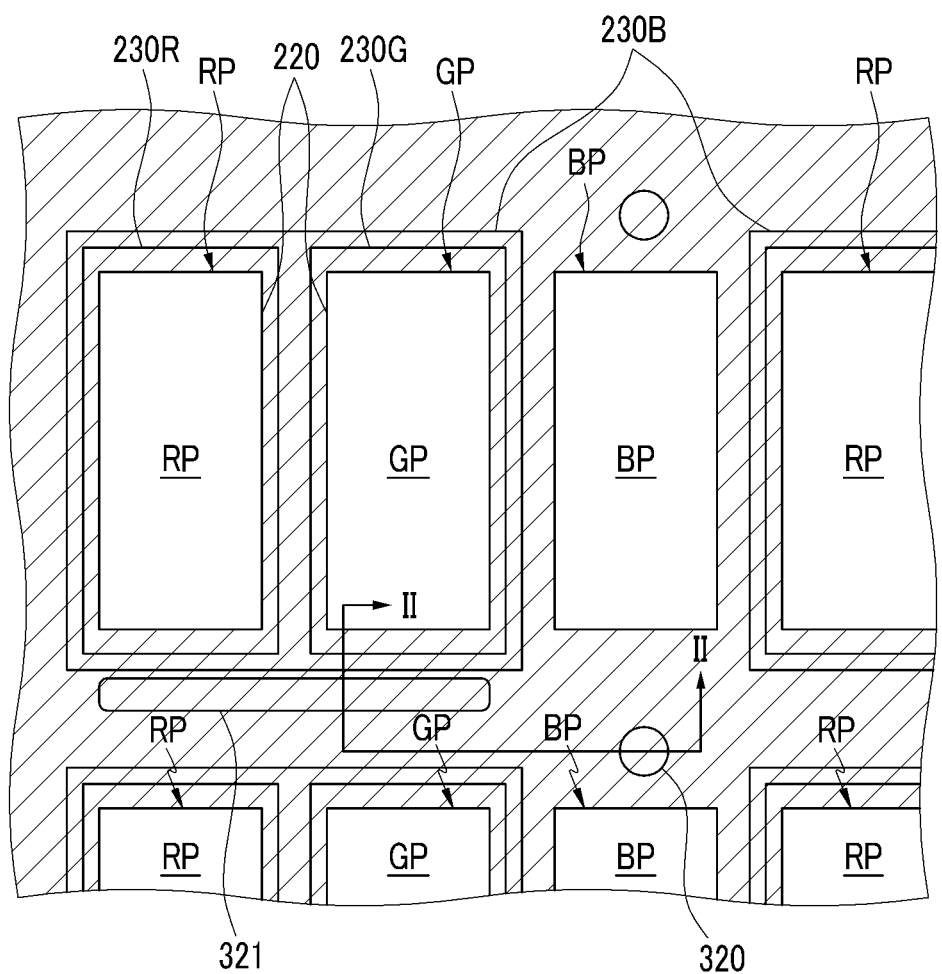
FIG. 7 is a top plan view of a display panel, according to exemplary embodiments of the present invention.

FIG. 7 is a top plan view of a display panel, according to exemplary embodiments of the present invention.

For the illustration purpose, referring to FIG. 7, the description of the display panel of FIG. 3 and FIG. 4 may be similarly be applied except for the sub-spacers 321 extending in the row direction between the red pixel areas RP, and between the green pixel areas GP. Also, the main spacers 320 may be extended in the row direction as well as the sub-spacers 321. For example, while reducing the number of the spacers 320 and 321, the area occupied with the spacers 320 and 321 may be maintained or increased. Accordingly, the restoring force of the spacers 320 and 321 can be increased and a margin for a filling amount of the liquid crystal may be improved.

One of the color filters 230R, 230G, and 230B may have a net shape, and the other two may have an island shapes. In this example, one of the net shaped color filters among the color filters 230R, 230G, and 230B may have a plurality of openings arranged in matrix, and two of the island-shaped color filters among the color filters 230R, 230G, and 230B can be disposed in the plurality of openings. For example, the blue color filter 230B may have the net shape, and the red color filter 230R and the green color filter 230G may have the island shape. Here, one of the red color filters 230R and one of the green color filters 230G can be disposed in the same opening of the blue color filter 230B. Also, when the red color filter 230R has the net shape, the green color filter 230G and the blue color filter 230B may have the island shape, and when the green color filter 230G has the net shape, the red color filter 230R and the blue color filter 230B may have the island shape. The color filters 230R, 230G, and 230B may face one another, and may overlap with one another, or may be separated from one another near the boundaries between the color filters 230R, 230G, and 230B.

The net-shaped light blocking member 220 may have a plurality of openings to pass the light therethrough. The island-shaped color filters 230R and 230G may respectively cover the openings of the light blocking member 220. The color filter 230B of the net shape may cover the opening of the light blocking member 220 that may not be covered by the island-shaped color filters 230R and 230G. The light blocking member 220 may be disposed between the plurality of island-shaped color filters 230R that may be arranged in the column direction. Also, the light blocking member 220 may be disposed between the island-shaped color filters 230R and 230G, and the net-shaped color filter 230B.

The main spacers 320 and the sub-spacers 321, having the thinner thicknesses than those of the main spacers 320, may overlap the blue color filter 230B. Accordingly, the main spacers 320 and the sub-spacers 321 disposed on the blue color filter 230B may have substantially the same thickness such that the thickness uniformity of the display panel may be further obtained. This may particularly be observed when compared with an approach that the spacers are disposed on the color filters of the different colors.

In some examples, it is contemplated that at least one of the plurality of main spacers 320 and the plurality of sub-spacers 321 may overlap with at least one of the net-shaped color filters 230R, 230G, and 230B among the color filters 230R, 230G, and 230B. For example, at least one of the plurality of main spacers 320 may be disposed between the pixel areas that represent the color of one of the net-shaped color filters 230R, 230G, and 230B. For example, the main spacer 320 may be disposed between the blue pixel area BP and another blue pixel area BP that may be disposed on or under thereof. One or more main spacers 320 may be formed in the display panel. The sub-spacers 321 may be respectively disposed between the plurality of green pixel areas GP and between the plurality of red pixel areas RP. In this example, at least one sub-spacer may be disposed between the color filters of the island shape arranged in the column direction. By way of configuration, one or more sub-spacers 321 may be formed in the display panel, or they may be omitted. Also, an arrangement, a number, and a shape of the main spacers 320 and sub-spacers 321 may be variously changed. For example, two or more of the plurality of main spacers 320 and the plurality of sub-spacers 321 may overlap one of the net-shaped color filters 230R, 230G, and 230B among the color filters 230R, 230G, and 230B, and thereby the thickness uniformity of the display panel may be obtained.

Next, a liquid crystal display according to exemplary embodiments of the present invention will be described with reference to FIG. 8 to FIG. 10. The same constituent elements as of the previous exemplary embodiment with respect to FIG. 1, FIG. 2, FIG. 3, FIG. 4, FIG. 5, FIG. 6 and FIG. 7 are indicated by the same reference numerals, and the same description may be omitted to avoid unnecessarily obscuring the present invention.

Figure 8:
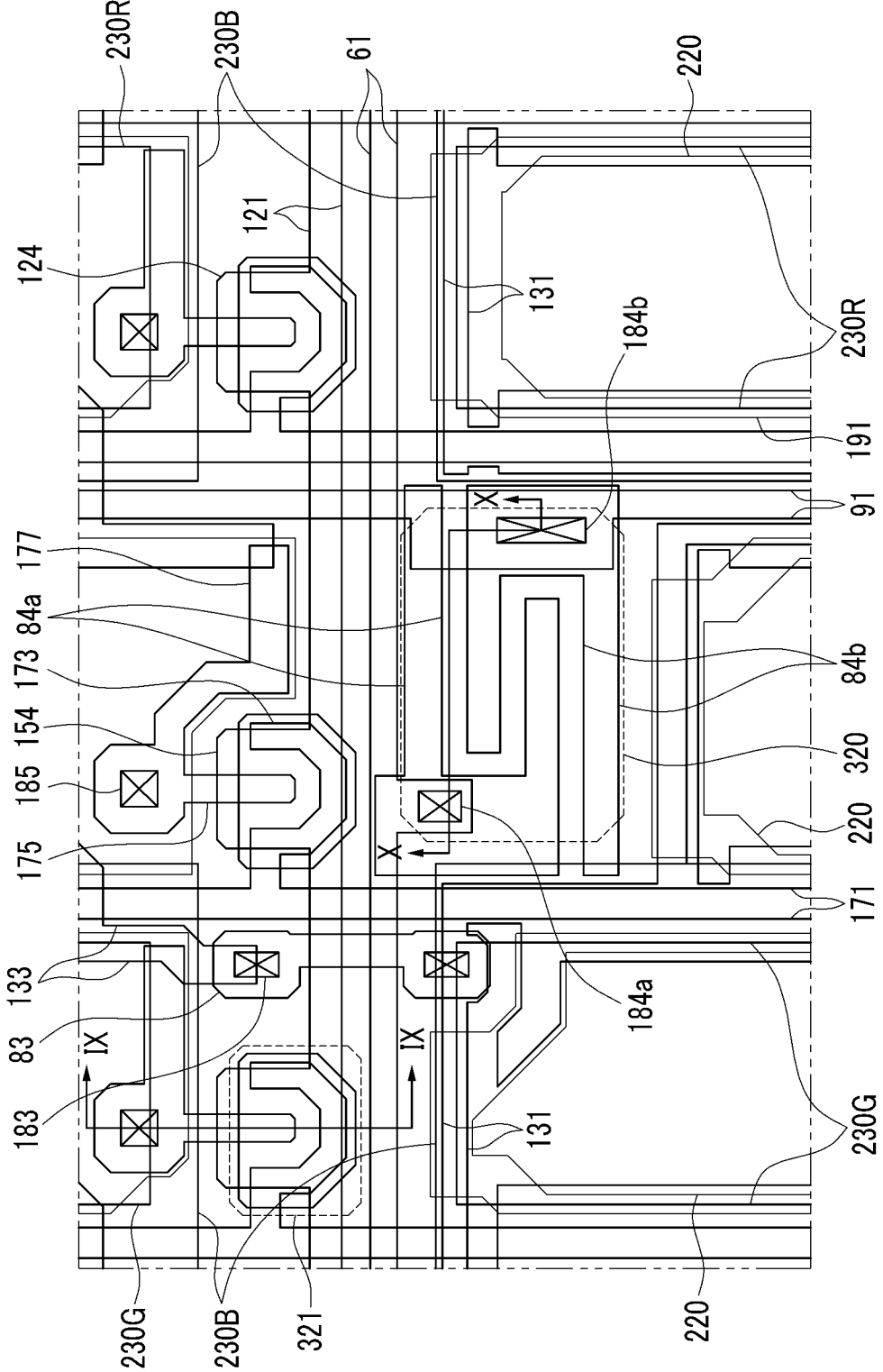
FIG. 8 is a top plan view of a liquid crystal display, according to exemplary embodiments of the present invention.
Figure 9:
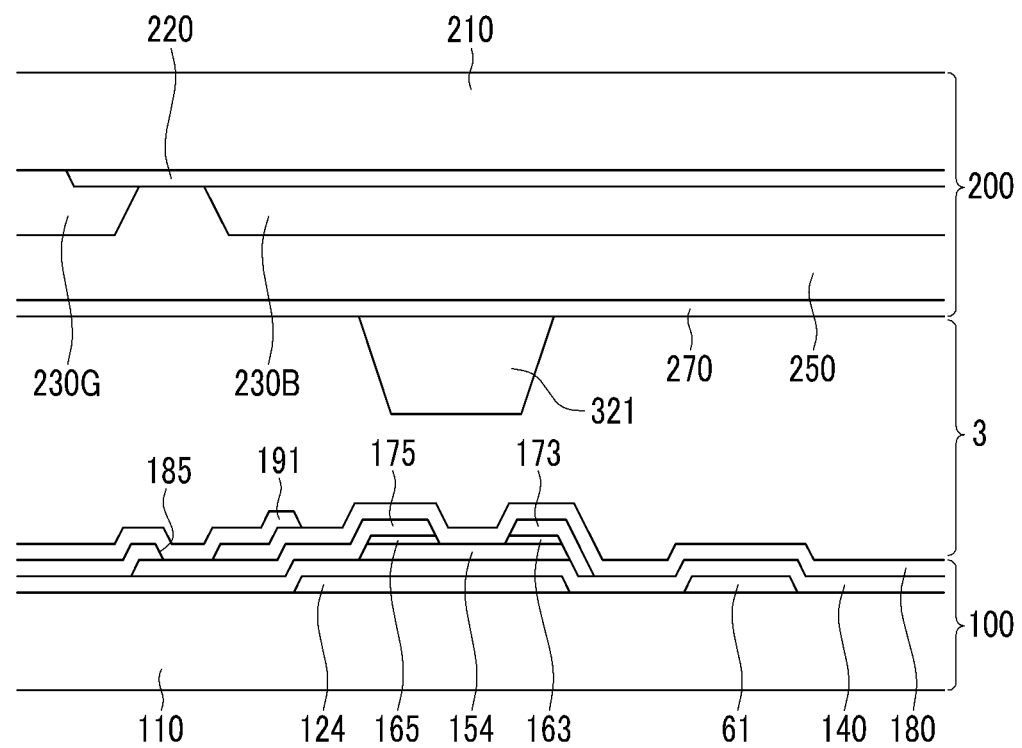
FIG. 9 is a cross-sectional view of the liquid crystal display of FIG. 8 taken along the line IX-IX.
Figure 10:
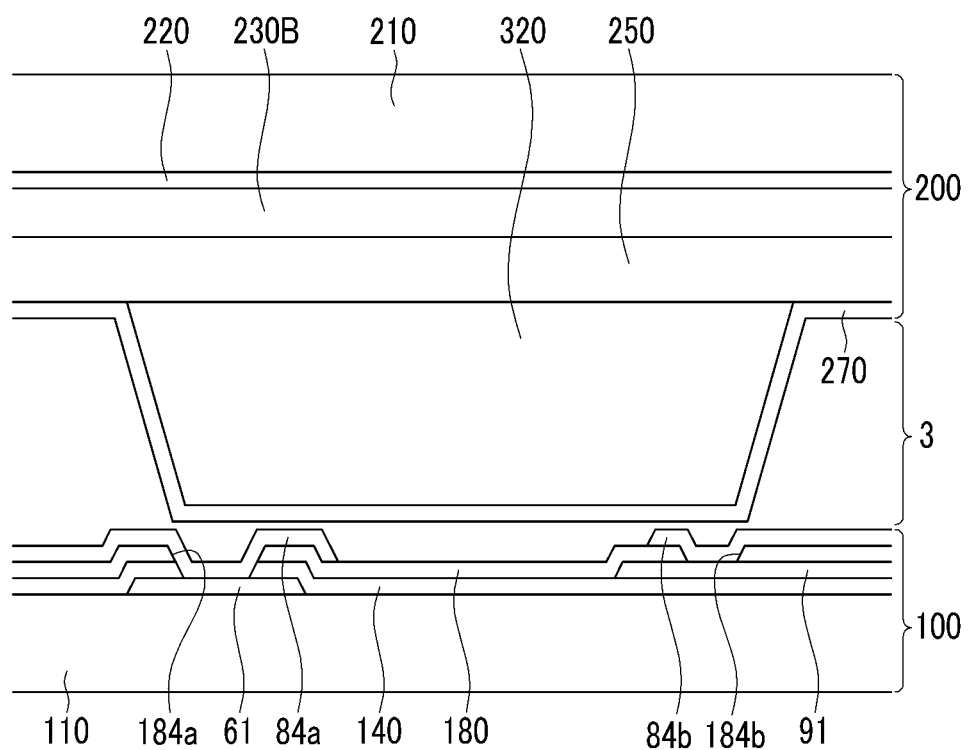
FIG. 10 is a cross-sectional view of the liquid crystal display of FIG. 8 taken along the line X-X.

FIG. 8 is a top plan view of a liquid crystal display, according to exemplary embodiments of the present invention, FIG. 9 is a cross-sectional view of the liquid crystal display of FIG. 8 taken along the line IX-IX, and FIG. 10 is a cross-sectional view of the liquid crystal display of FIG. 8 taken along the line X-X.

Referring to FIG. 8 to FIG. 10, a liquid crystal display may include a first display panel 100, a second display panel 200, and a liquid crystal layer 3 interposed between the first display panel 100 and the second display panel 200, and may have a contact sensing function capable of detecting external contact.

Alignment layers (not shown) may be formed on the inner surface of the first display panel 100 and the second display panel 200, and they may be homogeneous alignment layers. Polarizers (not shown) may be provided on the outer surface of the first display panel 100 and the second display panel 200.

Firstly, the first display panel 100 will be described.

A gate line 121, a storage electrode line 131, and a first sensing signal line 61 may be formed on a first substrate 110. The gate line 121, the storage electrode line 131, and the first sensing signal line 61 may be disposed with the same layer, may include a conductive material such as a copper, an aluminum, and alloys thereof, and may be a multiple layer structure such as double layers or triple layers.

The first substrate 110 may include a transparent insulating material. For example, the first substrate 110 may include a glass and a plastic.

The gate line 121 can transmit gate signals and can extend in a substantially horizontal direction. Each gate line 121 may include a plurality of gate electrodes 124 protruding in the upward direction.

The storage electrode line 131 can receive a predetermined voltage, and can extend parallel to the gate line 121. The storage electrode line 131 may close to the gate line 121. The storage electrode line 131 may include a storage electrode 133 extending in a substantially vertical direction. The storage electrode lines 131 may be connected to one another by a connecting member 83 through the storage electrode 133 and a contact hole 183. Here, the connecting member 83 may include a transparent conductive material or a reflective metal, and may be formed with the same process as a pixel electrode 191. Also, a shape, a connection, and an arrangement of the storage electrode line 131 and the storage electrode 133 may be variously changed by way of configuration for achieving an optimum manufacturing process.

The first sensing signal line 61 may be extended substantially parallel to the gate line 121. The first sensing signal line 61 may be closed to the gate line 121 under the gate line 121. The first sensing signal line 61 may be provided to transmit a coordinate of a position where external contact may be generated along with a second sensing signal line 91 to a sensing signal unit (not shown). The first sensing signal line 61 may be disposed with the same layer as the gate line 121, and the second sensing signal line 91 may be disposed with the same layer as the data line 171. The first sensing signal line 61 and the second sensing signal line 91 may respectively be connected to connect members 84a and 84b through contact holes 184a and 184b. The connecting members 84a and 84b may include the transparent conductive material or the reflective metal, and may be formed with the same process as the pixel electrode 191.

A gate insulating layer 140 may be formed on the gate line 121, the storage electrode line 131, and the first sensing signal line 61. The gate insulating layer 140 may include silicon nitride (SiNx) or silicon oxide (SiOx).

A semiconductor island 154 may be formed on the gate insulating layer 140. The semiconductor island 154 may be formed of hydrogenated amorphous silicon (referred to as "a-Si") or polysilicon. The semiconductor 154 may overlap the gate electrode 124, and the spacer 321 may be disposed at the overlapping region for maintaining the thickness uniformity of the first display panel 100.

Ohmic contacts 163 and 165 may be disposed on the semiconductor 154. The ohmic contacts 163 and 165 may include n+ hydrogenated amorphous silicon doped with an n-type impurity at a high concentration, or of silicide.

A data line 171, a drain electrode 175, and the second sensing signal line 91 may be formed on the ohmic contacts 163 and 165 and the gate insulating layer 140. The data line 171, the drain electrode 175, and the second sensing signal line 91 may be disposed with the same layer, may include a conductive material such as a copper, an aluminum, and alloys thereof, and may be a multiple layer structure such as double layers or triple layers.

The data line 171 may be provided to transmit data voltages and be extended substantially in the vertical direction thereby to intersect the gate line 121. The data line 171 is substantially parallel to the storage electrode 133, and may close to the gate electrode 124. The data line 171 may include a source electrode 173. The source electrode 173 may overlap the gate electrode 124. Also, the source electrode 173 may have various shapes such as a U-shape or J-shape.

The drain electrode 175 may be separated from the data line 171, and may include a protrusion member 177. The end of the drain electrode 175 may be enclosed by the source electrode 173, and the protrusion 177 may be extended substantially in the horizontal direction and may overlap a portion of the pixel electrode 191. By way of configuration, the protrusion 177 may be omitted. Further, a shape, a size, and an arrangement of the drain electrode 175 and a protrusion 177 may be variously changed. A portion of the drain electrode 175 can electrically be connected to the pixel electrode 191 through a contact hole 185.

The second sensing signal line 91 may substantially parallel to the data line 171. The second sensing signal line 91 may close to the left data line 171. The second sensing signal line 91 may be provided to transmit the coordinated position where the external contact is generated along with the first sensing signal line 61 to the sensing signal unit (not shown).

The gate electrode 124, the source electrode 173, and the drain electrode 175 may form a thin film transistor (TFT) along with the semiconductor 154, and the channel of the thin film transistor may be formed in the semiconductor 154 between the source electrode 173 and the drain electrode 175.

The ohmic contacts 163 and 165 may be interposed to a limited portion between the underlying semiconductor 154 and the overlying data line 171 and drain electrode 175, and this approach can reduce contact resistance therebetween. The semiconductor islands 154 may include some exposed portions, which may be overlapped with the data line 171, the drain electrode 175, and the second sensing signal line 91, along with a portion between the source electrode 173 and the drain electrode 175.

A passivation layer 180 may be formed on the data line 171, the drain electrode 175, the second sensing signal line 91, and the exposed semiconductor 154. The passivation layer 180 may include an organic insulating material or an inorganic insulating material such as a silicon nitride and a silicon oxide. The passivation layer 180 may include an upper layer and a lower layer, and in this example, the upper layer may include the organic insulating material and may have a thicker thickness than that of the lower layer. The passivation layer 180 may have contact holes 183, 184a, 184b, and 185.

The pixel electrode 191 and the connecting members 83, 84a, and 84b may be formed on the passivation layer 180. The pixel electrode 191 and the connecting members 83, 84a, and 84b may be disposed with the same layer, and may include a transparent conductive material such as ITO and IZO, or a reflective metal such as an aluminum, a silver, a chromium, or alloys thereof.

The pixel electrodes 190 may physically and electrically connected to the drain electrodes 175 through contact holes 185, and may be supplied with a data voltage from the drain electrodes 175. The pixel electrode 190 to which the data voltage is applied can generate an electric field along with the common electrode 270 of the second display panel 200, thereby determining the orientation of liquid crystal molecules of the liquid crystal layer 3 between the two electrodes 191 and 270. The luminance of light passing through the liquid crystal layers can be changed according to the orientation of the liquid crystal molecules.

The pixel electrodes 190 and the common electrode 270 may comprise a capacitor (hereinafter referred to as a "liquid crystal capacitor"). The liquid crystal capacitor may be provided to maintain a voltage applied thereto even after the thin film transistor is turned off.

The pixel electrode 191 may overlap the storage electrode line 131 and the storage electrode 133 thereby forming a storage capacitor.

Next, the second display panel 200 will be described.

The second display panel 200 may be applied with the description of the display panel of FIG. 6 and FIG. 7.

One of the color filters 230R, 230G, and 230B may have a net shape, and the other two may have island shapes. In this example, one of the net-shaped color filters among the color filters 230R, 230G, and 230B have a plurality of openings arranged in matrix, and two of the island-shaped color filters among the color filters 230R, 230G, and 230B may be disposed in the plurality of openings. For example, the blue color filter 230B may have the net shape, and the red color filter 230R and the green color filter 230G may have the island shape. For example, one of the red color filters 230R and one of the green color filters 230G may be disposed in the same opening of the blue color filter 230B. Also, when the red color filter 230R has the net shape, the green color filter 230G and the blue color filter 230B may have the island shape, and when the green color filter 230G has the net shape, the red color filter 230R and the blue color filter 230B may have the island shape. The color filters 230R, 230G, and 230B may face one another, may overlap each other, or may be separated from each other near the boundaries formed between the color filters 230R, 230G, and 230B.

The main spacers 320 and the sub-spacers 321, having the thinner thicknesses than those of the main spacers 320, may overlap the blue color filter 230B. Accordingly, the main spacers 320 and the sub-spacers 321 disposed on the blue color filter 230B may have substantially the same thickness such that the thickness uniformity of the display panel may be obtained. This scheme may particularly be observed when compared with an approach that the spacers are disposed on the color filters which represent different colors.

In some examples, it is contemplated that at least one of the plurality of main spacers 320 and the plurality of sub-spacers 321 may overlap with at least one of the net-shaped color filters 230R, 230G, and 230B among the color filters 230R, 230G, and 230B. That is, at least one of the plurality of main spacers 320 may be disposed between the pixel areas that may represent the color of one of the net-shaped color filter 230R, 230G, and 230B. For example, the main spacer 320 may be disposed between the blue pixel area BP and another blue pixel area BP that may be disposed on or under thereof. One or more main spacers 320 may be formed in the display panel. The sub-spacers 321 may respectively be disposed between the plurality of green pixel areas GP and between the plurality of red pixel areas RP. For example, at least one sub-spacer may be disposed between the color filters of the island shape arranged in the column direction. One or more sub-spacers 321 may be formed in the display panel, or they may be omitted by way of configuration. At least one of the plurality of main spacers 320 and the plurality of sub-spacers 321 may have a shape that may be extended in the column direction. For example, one main spacer 320 may simultaneously be disposed between the green pixel areas GP and between the blue pixel areas BP. Also, one sub-spacer 321 may simultaneously be disposed between the green pixel areas GP and between the red pixel areas RP. By way of configuration, an arrangement, a number, and a shape of the main spacers 320 and the sub-spacers 321 may be variously changed. For example, two or more of the plurality of main spacers 320 and the plurality of sub-spacers 321 may overlap with one of the net-shaped color filters 230R, 230G, and 230B among the color filters 230R, 230G, and 230B, and thereby the thickness uniformity of the display panel may be obtained.

The light blocking member 220 having a net shape may include a plurality of openings to pass the light therethrough. The color filters 230R and 230G of the island shape may respectively cover the openings of the light blocking member 220. The color filter 230B of the net shape may cover the opening of the light blocking member 220 that may not covered by the color filters 230R and 230G of the island shape. Also, the light blocking member 220 may be disposed on the second substrate 210, and may be disposed at the region overlapping with the gate line 121, the storage electrode line 131, the first sensing signal line, the data line 171, the second sensing signal line 91, the semiconductor 154, and the thin film transistor. An overcoat 250 may be disposed between the color filters 230R, 230G, and 230B, and the common electrode 270.

Referring to FIG. 10, if contact is generated at the external of the second display panel 200, the contact portion may be changed in the lower direction such that the distance can be closed along with the first display panel 100. Here, the portion of the common electrode 270 overlapping the upper surface of the spacer 320 may be contacted with the connecting members 84a and 84b. Accordingly, the connecting members 84a and 84b can electrically be connected to each other such that the first sensing signal line 61 and the second sensing signal line 91 as a pair intersecting the contact portion may transmit the sensing signal. Next, the sensing signal may be calculated and processed in the sensing signal unit (not shown) and the signal controller (not shown), thereby calculating the detection of the coordinated contact portion.

A display panel, according to exemplary embodiments of the present invention, may include a substrate, a first color filter and a second color filter disposed on the substrate. A plurality of spacers may be disposed on the first color filter and the second color filter. The first color filter is a net-shaped color filter including a plurality of openings and the second color filter is an island-shaped color filter disposed in the plurality of openings, and a plurality of spacers may overlap the color filter of the net shape.

The second color filter may include a plurality of island-shaped color filters arranged in a column direction, and at least one of a plurality of spacers may be disposed between the plurality of island-shaped color filters.

The plurality of spacers may have different thicknesses.

At least one of a plurality of spacers may be extended in a row direction.

The second color filter may include a plurality of island-shaped color filters arranged in the column direction, and a light blocking member disposed under the first color filter and the second color filter and disposed between the plurality of color filters of the island shape, and between the first color filter and the second color filter.

A common electrode may be disposed between the first color filter and the second color filter, and between a plurality of spacers.

A common electrode may be disposed on the first color filter and the second color filter, and at least one of a plurality of spacers may be disposed between the common electrode and the first color filter, or between the common electrode and the second color filter.

At least one of a plurality of spacers may be disposed on the common electrode.

A liquid crystal display according to exemplary embodiments of the present invention may include a first display panel and a second display panel facing each other. And a liquid crystal layer may be disposed between the first display panel and the second display panel. The second display panel may include a second substrate, a first color filter, and a second color filter disposed on the second substrate, and a plurality of spacers may be disposed on the first color filter and the second color filter. The first color filter is a net-shaped color filter including a plurality of openings, and the second color filter is an island shaped color filter disposed in the plurality of openings, and the plurality of spacers may overlap the color filter of the net shape.

The first display panel may include a first substrate, a gate line including a gate electrode disposed on the first substrate and, a first sensing signal line disposed on the first substrate, a semiconductor disposed on the gate electrode, a source electrode and a drain electrode disposed on the semiconductor to face each other, a data line disposed on the semiconductor to intersect the gate line, a second sensing signal line disposed on the semiconductor to intersect the first sensing signal line, and a pixel electrode connected to the drain electrode.

A first connecting member connected to the first sensing signal line and a second connecting member connected to the second sensing signal line may be further included, and at least one of the plurality of spacers may overlap the first connecting member and the second connecting member.

The first connecting member and the second connecting member may be disposed at the same layer as the pixel electrode.

A common electrode may be disposed on the first color filter and the second color filter, and a spacer may be provided to overlap the first connecting member and the second connecting member that may be disposed between the common electrode and the first color filter and second color filter.

A light blocking member may be disposed between the second substrate and the first color filter and second color filter.

A manufacturing method of a display panel according to exemplary embodiments of the present invention includes forming a first net-shaped color filter including a plurality of openings and a second island-shaped color filter disposed in the plurality of openings on a substrate, and forming a spacer overlapping the first color filter.

The second color filter may include a plurality of color filters of the island shape arranged in the column direction, and a light blocking member may be provided between the plurality of color filters of the island shape and between the first color filter and the second color filter may be formed prior to forming the first color filter or the second color filter.

A common electrode may further be formed on the first color filter and the second color filter prior to forming the spacer.

The spacer may include a plurality of spacers, and a common electrode on at least one of the plurality of spacers may be further included.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display panel comprising:
a substrate;
a first color filter and a second color filter disposed on the substrate; and
a plurality of spacers disposed on the first color filter and the second color filter,
wherein the first color filter is a net-shaped color filter comprising a plurality of openings disposed in a display area, and the second color filter is an island-shaped color filter disposed in the plurality of openings disposed in the display area, and
the plurality of spacers overlap the net-shaped color filter,
wherein the openings are defined by first portions of the first color filter extending in a first direction and connected to second portions of the first color filter extending in a second direction different from the first direction, the first and second portions of the first color filter being disposed in the display area.

2. The display panel of claim 1, wherein
the second color filter comprises a plurality of island-shaped color filters arranged in the column direction based on the substrate, and at least one of the plurality of spacers is disposed between the plurality of the island-shaped color filters.

3. The display panel of claim 2, wherein
the plurality of spacers have different thicknesses.

4. The display panel of claim 2, wherein
at least one of the plurality of spacers is extended in the row direction.

5. The display panel of claim 1, wherein
the second color filter comprises a plurality of island-shaped color filters arranged in the column direction, and
the display panel further comprises a light blocking member disposed under the first color filter and the second color filter, and the light blocking member is disposed between the plurality of island-shaped color filters and between the first color filter and the second color filter.

6. The display panel of claim 5, further comprising:
a common electrode disposed between the first color filter and the second color filter, and between the plurality of spacers.

7. The display panel of claim 6, wherein
at least one of the plurality of spacers is disposed between the plurality of island-shaped color filters.

8. The display panel of claim 7, wherein
the plurality of spacers have different thicknesses.

9. The display panel of claim 7, wherein
at least one of the plurality of spacers is extended in the row direction.

10. The display panel of claim 1, further comprising:
a common electrode disposed on the first color filter and the second color filter, and at least one of the plurality of spacers is disposed between the common electrode and the first color filter or between the common electrode and the second color filter.

11. The display panel of claim 10, wherein
at least one of the plurality of spacers is disposed on the common electrode.

12. The display panel of claim 11, wherein
the second color filter comprises a plurality of island-shaped color filters arranged in the column direction, and
at least one of the plurality of spacers is disposed between the plurality of island-shaped color filters.

13. The display panel of claim 12, wherein
the plurality of spacers have different thicknesses.

14. The display panel of claim 13, wherein
at least one of the plurality of spacers is extended in the row direction.

15. A liquid crystal display comprising:
a first display panel and a second display panel facing each other; and
a liquid crystal layer disposed between the first display panel and the second display panel,
wherein:
the second display panel comprises:
a second substrate;
a first color filter and a second color filter disposed on the second substrate; and
a plurality of spacers disposed on the first color filter and the second color filter;
the first color filter is a net-shaped color filter comprising a plurality of openings disposed in a display area;

the second color filter is an island-shaped color filter disposed in the plurality of openings disposed in the display area;
the plurality of spacers overlap the net-shaped color; and
the first display panel comprises:
- a first substrate;
- a gate line comprising a gate electrode disposed on the first substrate;
- a first sensing signal line disposed on the first substrate;
- a semiconductor disposed on the gate electrode;
- a source electrode and a drain electrode disposed on the semiconductor to face each other;
- a data line disposed on the semiconductor to intersect the gate line;
- a second sensing signal line disposed on the semiconductor to intersect the first sensing signal line; and
- a pixel electrode connected to the drain electrode.

16. The liquid crystal display of claim 15, further comprising:
- a first connecting member connected to the first sensing signal line; and
- a second connecting member connected to the second sensing signal line, wherein at least one of the plurality of spacers is provided to overlap the first connecting member and the second connecting member.

17. The liquid crystal display of claim 16, wherein
the first connecting member and the second connecting member are disposed at the same layer as the pixel electrode.

18. The liquid crystal display of claim 17, further comprising:
- a common electrode disposed on the first color filter and the second color filter, and the spacer is provided to overlap the first connecting member, and the second connecting member is disposed between the common electrode and between the first color filter and the second color filter.

19. The liquid crystal display of claim 18, wherein at least one of the plurality of spacers is disposed on the common electrode.

20. The liquid crystal display of claim 15, further comprising a light blocking member disposed between the second substrate and between the first color filter and the second color filter.

* * * * *